United States Patent [19]

Gordon, Jr.

[11] 4,239,322

[45] Dec. 16, 1980

[54] POLARITY PROTECTOR

[75] Inventor: Walter H. Gordon, Jr., Huntington, Conn.

[73] Assignee: General Electric Company, New York, N.Y.

[21] Appl. No.: 33,102

[22] Filed: Apr. 25, 1979

[51] Int. Cl.³ .................. H01R 13/64; H01R 13/58
[52] U.S. Cl. ........................ 339/184 M; 339/105; 339/256 RT
[58] Field of Search ............... 339/184, 47 R, 105, 339/228, 59, 61, 65, 116, 213, 256 RT

[56] References Cited

U.S. PATENT DOCUMENTS

| | | | |
|---|---|---|---|
| 995,674 | 6/1911 | Hertzberg | 339/47 R |
| 1,277,071 | 8/1918 | Hastings et al. | 339/184 R |
| 1,712,738 | 5/1929 | Spidel | 339/105 X |
| 2,989,722 | 6/1961 | O'Donnell | 339/184 R X |
| 2,992,403 | 7/1961 | Hawk | 339/213 R |
| 2,993,189 | 7/1961 | Schelke | 339/184 R X |
| 3,059,214 | 10/1962 | Heller | 339/184 |
| 3,185,953 | 5/1965 | Prifogle | 339/184 M X |
| 3,487,353 | 12/1969 | Massa | 339/184 R X |
| 3,980,388 | 9/1976 | Nailor | 339/228 X |
| 4,024,953 | 5/1977 | Nailor | 339/228 X |
| 4,084,037 | 4/1978 | Morton | 429/1 |

FOREIGN PATENT DOCUMENTS 560973  4/1975  Switzerland .................. 429/1

*Primary Examiner*—John McQuade
*Assistant Examiner*—John S. Brown
*Attorney, Agent, or Firm*—John F. Cullen; G. R. Powers; L. J. Platt

[57] ABSTRACT

A battery terminal harness is provided to connect to a battery with the harness having a first male terminal coupled to a first female battery terminal of one polarity and a second female terminal on the harness coupled to a second male battery terminal of the opposite polarity. To this standard construction an improvement is provided in the harness of an insulating support member with an opening between the harness terminals and each of the male and female harness terminals being mounted on and extending a fixed distance from the support member to mate electrically with its opposite battery terminal. An insulating washer-like resilient plastic cover member having an axial height exceeding the fixed distance of the harness terminals and having tab structure for securement to a harness terminal is provided. The connecting wires to an electric circuit lock through the support opening such that the cover member snaps axially over and is secured to one of the harness terminals, preferably the female terminal, whereby the cover member prevents any contact between the female terminals at all times to avoid inadvertent reverse polarity.

4 Claims, 5 Drawing Figures

U.S. Patent      Dec. 16, 1980      4,239,322
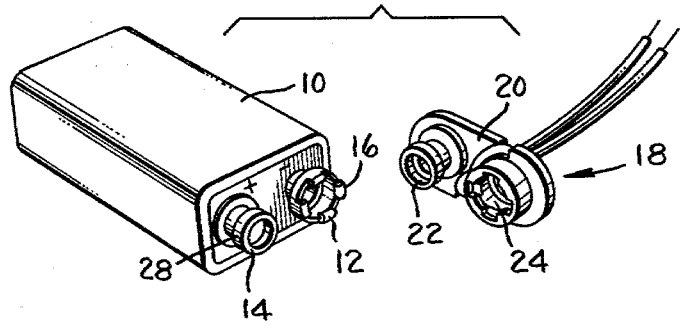
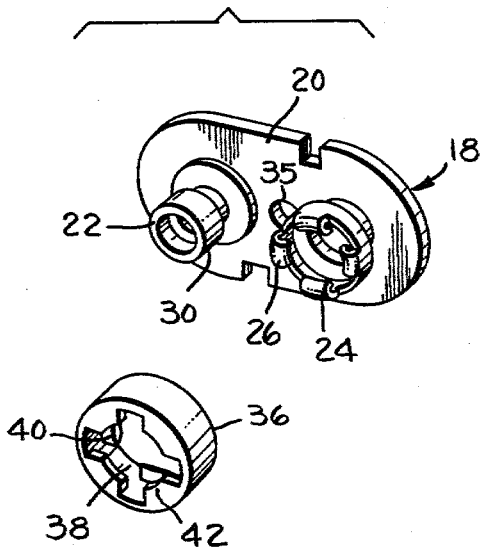
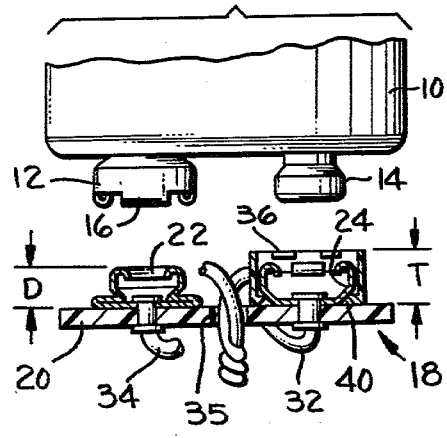
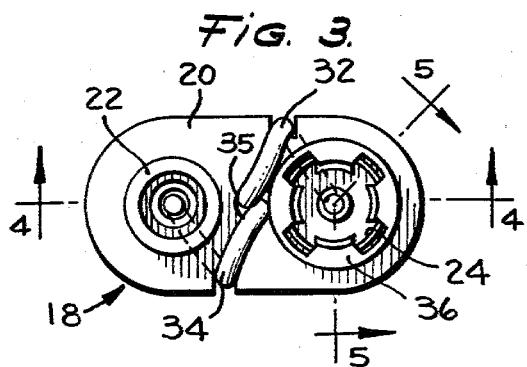
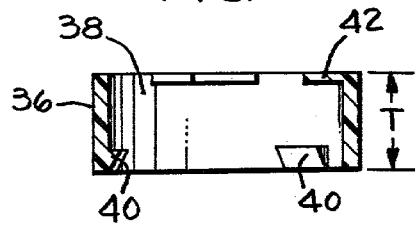

POLARITY PROTECTOR

BACKGROUND OF THE INVENTION

1. Field of the Invention

The invention is directed to a battery terminal harness and, more particularly, to an insulated battery terminal harness having improved fastening means preventing the application of reverse polarity voltage to a circuit connected to the harness.

2. Description of the Prior Art

For proper operation, many battery-operated electrical circuits including virtually all electronic circuits, must be connected to the battery with a particular polarity. The "positive" polarity input terminal to the circuit must be connected to the positive or plus terminal of the battery and the "negative" polarity input terminal to the circuit must be connected to the negative or minus terminal of the battery. To assure proper polarity connections, it is common to use batteries having dissimilar terminals and battery terminal harnesses having mating dissimilar connectors—generally a male stud-like connection and a female flexible peripherally spaced finger connection. By connecting the harness to the electrical circuit in the desired manner, the user can be assured that the battery is connected with the correct polarities since the battery terminals and the terminal connectors will mate with only the desired polarity. Nevertheless, reverse voltage can be applied to the circuit if the harness connectors are inadvertently pressed against the battery terminals in reverse orientation. While the battery terminals will not mate with the harness connectors in the reverse position, the short term reverse voltage applied to the circuit by such connection may damage or lessen the reliability of the circuit. Accordingly, it is common to protect the circuit against the application of short-term reverse voltage by means of an appropriate diode or other one-way protective device. This approach is not always desirable, however, since such protective elements introduce operative deficiencies and result in extra cost.

Patent application Ser. No. 3,419, now abandoned, discloses an inexpensive and effective means for preventing inadvertent application of short-term reverse voltage. It teaches the use of an insulating cover member on the battery terminal harness for preventing unwanted contact between one of the terminal connectors and the non-mating battery terminals.

Patent application Ser. No. 1,550 is directed to similar subject matter and is an improvement on the Ser. No. 3,419 now abandoned structure by simplifying and reducing the cost of such structure. Both applications are of common assignment.

SUMMARY OF THE INVENTION

It is therefore the primary object of this invention to provide improved means for preventing the application of reverse voltage to a battery operating electrical circuit.

Another object is to provide inexpensive and positive means for preventing the application of short term reverse voltage to a battery operated electrical circuit.

A still further object of the invention is to provide the above means in a manner not requiring changes in the standard battery terminals and the addition of only a single washer element with substantially less additional labor.

Another object of the invention is to provide the above objects in an inexpensive manner.

Briefly stated, in carrying out the invention in one form, a standard battery terminal harness is provided for connection to a battery, the harness having a first male terminal coupled to a first female battery terminal of one polarity and a second female terminal coupled to a second male battery terminal of the opposite polarity. To this standard structure, the invention provides an improvement in the harness which comprises an insulating support member having an opening between the harness terminals and having the male and female harness terminals each mounted on the support member and extending a fixed distance therefrom and adapted to mate electrically each with its opposite battery terminal. Wire means is suitably locked through the support opening connecting each of the harness terminals with an electric circuit. An insulating washer-like cover member of integrally molded resilient plastic is axially removably secured and supported solely by one harness terminal, preferably the female terminal, with the washer cover member having an axial height exceeding the fixed distance of the harness terminals. The washer cover has radially inward extending tabs on its inner and outer ends and has a diameter less than the diameter across the female terminal such that the washer member may be snapped over the female terminal with the inner tabs retaining the washer on the female terminals and the outer tabs preventing contact between a like terminal such as a battery female terminal to preclude reverse polarity contact of the harness and battery terminals at all times. Thus, the main object of the invention is to provide a simple suitably sized and formed single washer element cover in the terminals harness that may be snapped on during assembly to eliminate any possibility of inadvertent reverse polarity contact.

BRIEF DESCRIPTION OF THE DRAWING

FIG. 1 shows a standard 9-volt battery with dissimilar terminals and a terminal harness of the present invention;

FIG. 2 is an exploded perspective view of the terminal harness of FIG. 1;

FIG. 3 is a plan view of the terminal harness of FIG. 1;

FIG. 4 is an exploded elevation view showing the parts of FIG. 1 and taken partly on line 4—4 of FIG. 3 and, FIG. 5 is a sectional view of a cover member taken on line 5—5 of FIG. 3.

DESCRIPTION OF THE PREFERRED EMBODIMENT

The invention is applicable to any battery terminal harness using the conventional male/female connections as especially used with the well known 9-volt battery and is an improvement on co-pending applications Ser. Nos. 3,419 now abandoned and 1,550 supra and consequently incorporates much of their description herein. Referring first to FIG. 1, a typical 9-volt battery 10 of the type widely used to power electronic circuits is shown, the battery 10 having dissimilar negative and positive terminals 12 and 14 respectively. The first negative female terminal 12 is of annular resilient finger configuration for peripherally engaging a cylindrical male stud member having substantially the same configuration as the positive male battery terminal 14 also of cylindrical stud configuration. More particularly, the negative terminal 12 is of general cylindrical configuration with axially extending radially resilient fingers 16 for radially coupling with the outer cylindrical surface of a male stud harness terminal of opposite polarity. The axis of the negative and positive terminals 12 and 14 are typically spaced apart by approximately one half inch in conventional well known 9-volt batteries of the flat type as shown in FIG. 1.

The battery terminal harness 18 as shown in FIGS. 1-4 includes an insulating support member 20 of fiberboard or other insulating material upon one side of which a first male harness terminal connector 22 and a second female harness terminal connector 24 are mounted with each terminal extending a fixed distance D from the support member as shown in FIG. 4. The first male terminal connector 22 has substantially the same configuration as that of the negative battery terminal 12 such that the positive battery terminal 14 can be snapped into the connector 24, the annular spaced deformable fingers 26 of the connector 24 resiliently engaging the outer cylindrical surface 28 of the male terminal 14. Similarly, the second female terminal connector 24 is a mating configuration for the second positive battery terminal 14 such that the first negative battery terminal 12 can be snapped over the connector 22, the fingers 16 of the terminal 12 resiliently engaging the outer cylindrical surface such as 30 of the connector 22. The axes of the harness terminals or connectors 22 and 24 are spaced apart by substantially the same amount as the battery terminals 12 and 14 such that the terminals 12 and 14 may be simultaneously engaged with the connectors 22 and 24 respectively as best shown by FIG. 4. The resilient connections between the terminals assures that the battery terminal harness 18 is firmly held on the battery 10. Such structure as presently described in generally well known and common to all 9-volt battery electrical applications.

As best shown by FIGS. 3 and 4, the terminal connector 24 is connected to an electrical lead wire 32 directed to the opposite side of the insulating support member 20, and the terminal connector 22 is connected to an electrical lead wire 34 which also comes out of the opposite side of the insulating support member 20. Since the connector 24 can only mate with the positive battery terminal 14, the lead wire 32 is the positive lead to any circuit connected to the battery terminal harness. Similarly, since the male connector 22 can only mate with the negative battery terminal 12 the lead 34 is the negative lead to any circuit connected to the battery terminal harness 18.

Strain relief and locking is conventionally provided by reverse feeding the lead wires 32 and 34 through a circular or equivalent opening 35 in the insulating support member disposed between the harness terminals or connectors 22 and 24.

In accordance with the invention, an insulating washer-like cylindrical cover member 36 is provided for assuring that reverse voltage cannot be applied at any time to the leads 32 and 34 and thus any circuit connected thereto. Reverse polarity voltage could be applied if the terminal 14 and the connector 22 were touched and the terminal 12 and the connector 24 were touched at the same time. Even though the harness 18 could not be axially snapped onto the battery 10 under these conditions, the short-term reverse voltage could cause failure or reduce the life of many electronic circuits normally powered in the illustrated manner.

As shown, insulating cylindrical cover member 36 slides axially to form a cup over terminal connector 24. Cover member 36 has a circular opening 38 therein with the opening being large enough to permit the battery terminal 14 to pass through to couple with the second female harness terminal 24. Part of the inner diameter of opening 38 of the cover member is less than the diameter across the spaced deformable fingers 26 of the female terminal 24 so the cover member 36 may be snapped snugly on the terminal slightly deflecting the fingers 26 as shown in FIG. 4. In order to prevent any reverse polarity, the washer cover 36 is formed to have a thickness T that exceeds the fixed distance D of the harness terminals by a small amount as shown in FIG. 4. Additionally, for securing the cover 36 in position it is formed with peripherally spaced radially inwardly extending tabs 40 on the inner end of the cover member and outer tabs 42 on the outer end of the cover. The diameter across the inner tabs is less than the diameter across the deformable fingers 26 of female terminal 24, the arrangement being such that the cover member may be snapped only onto terminal 24 over the annular spaced fingers 26 to lock under them as shown in FIG. 4 and hold the cover 36 snugly in place. For preventing any contact by a like female terminal, the cover 36 is also provided with peripherally spaced radially extending inward tabs 42 on the outer end of the cover. The ends of the fingers 26 are clearly shown in FIG. 4. This arrangement precludes any possible connection between like female terminals while permitting unobstructed connection by the male terminal 14 of the battery. Also the parts are sized such that the cover member 36 clearly will not axially snap on the harness terminal 22 since it is too large for the male terminal.

The arrangement of the simple washer-like plastic resilient cover member 36 is such that it may easily be slid or snapped on the female harness terminal 24 during assembly of the particular electronic component and is removably secured only to the terminal thus requiring no additional structure to also secure it to the support member 20. The part is easily molded in one piece and the dimensions may be varied so long as the axial height T is greater than the fixed extension distance D of the terminals. Finally, as part of the molding there is a means such as tabs 42 to prevent any contact with the matching terminal at all times. From the foregoing, it will be seen that this invention provides an improvement on the co-pending applications of a simple formed washer that is easily attached during assembly, that is inexpensive, and that cannot be attached improperly and absolutely precludes inadvertent reverse polarity contact at any time while doing so in a very easily assembled inexpensive part.

While there has been described a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. A battery terminal harness for connection to a battery, the harness having a first male stud terminal adapted to be coupled to a first female battery terminal of one polarity and a second harness female terminal adapted to be coupled to a second male stud battery terminal of the opposite polarity, the improvement in said harness comprising, an insulating support member, said male and female harness terminals each mounted on and extending a fixed distance from said support member and each adapted to mate electrically with its opposite battery terminal, an insulating washer-like cover member axially removably secured solely to the female of said harness terminals, said washer cover member having an axial height exceeding the fixed distance of said harness terminals, and wire means locked through said support member connecting each harness terminal with an electric circuit, whereby the washer cover member prevents contact between said female harness terminal and said female battery terminal but permits contact between said female harness terminal and said male stud battery terminal to preclude reverse polarity contact of said harness and battery terminals at all times.

2. Apparatus as described in claim 1 wherein said female terminals are of annular spaced deformable finger configuration for peripherally engaging the male stud terminals.

3. Apparatus as described in claim 2 wherein said washer-like cover member is cylindrical and integrally formed of resilient plastic.

4. Apparatus as described in claim 3 wherein a diameter said plastic cover member is less than the diameter across the deformable fingers of said female harness terminal for snugly snapping said resilient cover member over said female harness terminal.

* * * * *